United States Patent [19]

Lindörfer et al.

[11] Patent Number: 4,692,061
[45] Date of Patent: Sep. 8, 1987

[54] PROCESS FOR DUMPING OF PARTICULATE SOLID WASTE MATERIALS IN UNDERGROUND SALT ENCLOSED CAVITIES

[75] Inventors: Walter Lindörfer, Kassel; Wilhelm Jahn-Held, Staufenberg, both of Fed. Rep. of Germany

[73] Assignee: Wintershall AG, Kassel, Fed. Rep. of Germany

[21] Appl. No.: 717,399

[22] Filed: Mar. 29, 1985

[30] Foreign Application Priority Data

Mar. 31, 1984 [DE] Fed. Rep. of Germany ....... 3411998
Jun. 25, 1984 [DE] Fed. Rep. of Germany ....... 3423387
Jul. 21, 1984 [DE] Fed. Rep. of Germany ....... 3426960

[51] Int. Cl.$^4$ .......................... B09B 3/00; E02D 3/12
[52] U.S. Cl. .................................. 405/128; 405/267; 405/52
[58] Field of Search ................. 405/128, 129, 52, 53, 405/54, 55, 56, 57, 58, 59, 266, 267; 210/170; 252/633

[56] References Cited

U.S. PATENT DOCUMENTS

| | | | |
|---|---|---|---|
| 3,196,619 | 7/1965 | Shock | 405/128 |
| 3,887,462 | 6/1975 | Lagess et al. | 210/747 |
| 3,893,656 | 7/1975 | Opacic et al. | 405/128 |
| 3,906,733 | 9/1975 | Koppers | 405/296 |
| 4,435,290 | 3/1984 | Lindorfer et al. | 405/53 |
| 4,456,400 | 6/1984 | Heide et al. | 405/266 |
| 4,488,834 | 12/1984 | Hooper et al. | 405/53 |

FOREIGN PATENT DOCUMENTS

| | | |
|---|---|---|
| 3141884 | 5/1983 | Fed. Rep. of Germany . |
| 3141885 | 5/1983 | Fed. Rep. of Germany . |
| 3423387 | 6/1984 | Fed. Rep. of Germany . |
| 3411998 | 3/1985 | Fed. Rep. of Germany . |

Primary Examiner—Dennis L. Taylor
Attorney, Agent, or Firm—M. N. Meller

[57] ABSTRACT

Rock salt solution contained in the salt cavern is pumped out, after which particulate solid waste materials are treated with dust suppressant agents to form free-flowing, non-dusting, readily usable mixtures, which are introduced into the cavern by trickling, or the salt cavern filled with rock salt solution is filled with a pumpable mixture of solid and liquid waste materials in such a way that the displaced volume of salt solution is pumped out and, after filling the cavern to about two thirds to three quarters of its volume, the water of the liquid phase is bound in the form of water of crystallization or as hydroxide or physically by adsorption through addition of hydrophilic compounds or substances as a means of solidifying it, and the cavern is then sealed.

13 Claims, 2 Drawing Figures

PROCESS FOR DUMPING OF PARTICULATE SOLID WASTE MATERIALS IN UNDERGROUND SALT ENCLOSED CAVITIVES

BACKGROUND OF THE INVENTION

The continuous rise in the world population is accompanied by similarly constant increases in waste materials in industry, trades and households, the harmless disposal of which represents an ongoing problem, particularly when these waste materials contain constituents which are damaging to the environment or to health.

Waste materials of this kind are also generated by processes which are applied to reduce the waste materials, such as the incineration of domestic refuse or combustible wastes from industry; in refuse incineration, for example, 30 to 40% by weight of residues, which can contain toxic and/or environmentally damaging constituents, are obtained relative to the input quantity. Solid waste materials are also generated in the purification of flue gases, including those from refuse incineration plants, which are environmentally harmful because of their content of pollutants. The deposition of such waste materials which contain more or less water soluble constituents on unprotected dumps above ground is not possible, since the water from natural precipitation forms solutions with the water soluble constituents of such waste materials which permeate into the subsoil, damage it and represent a hazard for ground water. For these reasons, waste materials of this kind can only be deposited on aboveground dumps which are securely sealed off against the subsoil and surrounding land in the form of special refuse dumps and which are equipped with devices for the harmless disposal of liquids issuing from the dumped material.

Processes are known whereby waste materials in liquid or sludge form are converted into solid products through the admixture of flue ash and quicklime and of hot bitumen or meltable plastics in so-called silicate binders such as water-glass or of these binders themselves. Harmful substances can, however, also be released from these solid products by the action of moisture and precipitation if they are deposited on unprotected dumps, so that these solid products also can be stored only on special refuse dumps.

In DE-OS No.34 11 998 a process is proposed for the storage or ultimate disposal of solid, particulate waste materials in salt caverns equipped with pipelines for filling and evacuation. According to this process, these waste materials are first mixed with a rock salt solution withdrawn from a salt cavern to form a pumpable mixture which is then pumped into the salt cavern.

The process specification contained in DE-OS No.34 11 998 also admits the possibility of introducing particulate solids in a dry state into salt caverns through fall pipes. The particulate solids can also first be compactly enclosed in coating material and introduced in this form into the salt caverns by free fall through suitably dimensioned fall pipes.

In both cases, a corresponding volume of air is displaced from the salt cavern and this air is highly charged with the dust from the introduced waste materials and it must be purified by technically elaborate methods before being discharged into the atmosphere.

With the process described in DE-OS No.34 11 998, a volume of rock salt solution equal to the volume of introduced waste materials must be continuously withdrawn from the cavern and disposed of in a non-polluting manner. If no harmful substances originating from the waste materials have become dissolved in this rock salt solution, the rock salt solution can be dumped at sea without adverse effects, the only expense involved being that for transportation. If, however, the rock salt solution present in the salt cavern is expected to be contaminated with harmful materials, according to a recent, still unpublished proposed method, its density can be increased almost to the point of solidification by adding substances which react with binding of water of crystallization, and the salt cavern is then sealed. With this method, however, part of the volume of the salt cavern cannot be filled with waste materials.

The waste materials mentioned above are generated not only by production processes in industry, trades and in households, but also by processes applied to reduce the quantity of such waste materials, for example by incineration According to data presented by Thomé-Kozmiensky in "Müllverbrennung und Rauchgasreinigung", Publ. E. Freitag, Berlin (1983), p. 1058, in 1978 6 million tons of domestic refuse were already being incinerated in 42 refuse incineration plants in the Federal Republic of Germany, from which however 2 million tons of combustion products were obtained which can contain environmentally damaging and even toxic constituents. On page 31 of the above publication it is stated that the residues from refuse incineration contain percentage by weight proportions of the following metals:
cadmium 11.7,
chromium 1195,
copper 871,
lead 7273,
zinc 26600,
nickel 778.

These combustion products must therefore be treated as special refuse, the ultimate disposal of which cannot be effected on ordinary unprotected dumps.

Furthermore, in the purification of flue gases which is necessary in the incineration of domestic refuse to remove sulfur and nitrogen oxides and halogens, further quantities of waste materials are obtained which also contain heavy metals and which because of their contaminant content must be treated as special refuse.

By applying costly and elaborate measures, therefore, domestic refuse can be reduced to special refuse in refuse incineration plants in quantities representing about one third of the original input.

Desulfurization of flue gases of coal firing plants also generates considerable amounts of waste materials which consist of calcium, sulfate dihydrate (flue gas gypsum) or ammonium sulfate depending on the process employed. The quantity of flue gas gypsum generated in the Federal Republic of Germany is currently 2 million tons per year and is expected to increase in future. Providing that this flue gas gypsum is only contaminated with heavy metals within certain limits, it can be utilized for industrial purposes. For example, a process for the recovery of gypsum in flue gas desulfurization is known from DE-OS No.33 12 388.

It has been recommended that the ammonium sulfate obtained in flue gas desulfurization should be used as nitrogen fertilizer. Since however this ammonium sulfate is generally also contaminated with heavy metals, the introduction of excessive amounts of heavy metals into cultivated land may result. Ammonium sulfate is also generated in the manufacture of plastics and in the purification of coking plant gas. The total quantity of ammonium sulfate obtained from these known processes greatly exceeds the levels required for soil fertilization.

The depositing of such waste materials, which are more or less water soluble, on unprotected dumps above ground is impossible, since water from natural precipitation and from waste materials not dumped in the dry state form solutions with the water-soluble components of the deposited wastes, which permeate into the subsoil, and contaminate not only the subsoil but also the ground water. Only if aboveground dumps are securely sealed off from the subsoil and the surrounding land and if harmless disposal of the liquids issuing from the dumped materials is guaranteed, can waste materials of this kind be dumped in this way.

Waste materials of this kind can only be dumped in underground mine workings of abandoned mines which have not been sealed if they are contained in non-leaking containers.

Safe dumping of the waste materials referred to is thus technically always highly demanding.

It is also conceivable to dump solid waste materials in salt caverns. Without additional measures, however, such waste materials can only be trickled into the salt cavern in superfine particulate form and in a completely dry state through fall pipes. The air which is thereby displaced from the salt cavern must, however, be conducted to a de-dusting plant in order to reliably remove from it the dust originating from the waste material. The same applies for pneumatic introduction of the particulate solid waste materials into a salt cavern. These methods of dumping solid waste materials in salt caverns, which are of only limited practicability, could only be realized with the aid of technically very elaborate systems.

It is naturally also feasible to enclose the particulate waste materials, divided into partial quantities, in wrappings consisting, for example, of plastic film and to introduce them into the salt caverns in this form by free fall through suitably dimensioned fall pipes. Apart from the technical demands involved in filling the waste materials in the wrappings and ensuring that they are tightly sealed, this method requires the use of fall pipes whose internal diameter must be greater than that of the piping generally used for salt caverns. With this procedure, moreover, considerable dust loading of the air displaced and issuing from the salt cavern is not excluded, since the wrappings may burst during their free fall through the fall pipes and when hitting the bottom of the salt cavern or the waste materials which have already been introduced in wrappings. This method therefore also necessitates technically demanding purification of the air issuing from the salt cavern.

A process is also known from DE-OS Nos. 31 41 884 and 31 41 885 whereby pumpable waste materials are introduced into salt caverns for ultimate storage or for complete or partial re-use. With this method, liquid waste materials are mixed with solid waste materials to form pumpable mixtures which are introduced into salt caverns for ultimate disposal or disposal in such a way that re-usable parts of the stored material can be withdrawn again from the salt cavern. To ensure the pumpability of these mixtures, their content of liquid waste material must be relatively high, so that this method therefore allows only relatively limited quantities of solid waste materials to be introduced into a salt cavern, the remaining volume of which is filled with liquid.

SUMMARY OF THE INVENTION

The subject of the invention is a process for dumping particulate solid or waste materials as dry or as pumpable solid and liquid waste materials in underground, salt enclosed cavities, in particular salt caverns, which are equipped with pipelines for filling and evacuation, by trickling in the particulate solid waste materials or by pumping in a mixture of the particulate solid waste materials with liquid waste materials through the pipelines used for filling the cavity.

One object of the process according to the invention is to deposit solid, particulate waste materials or pumpable mixtures of these waste materials in large storage quantities in underground cavities, preferably in salt caverns, thereby avoiding aboveground dumps and the associated high cost of securing such dumps against contamination of the subsoil, or of underground dumping in sealed containers in the shafts of mineworkings. It is also an object of the subject according to the invention to deposit solid waste materials underground in salt caverns, avoiding dust generation and thus eliminating the need to remove superfine particulate dusts above ground.

It is another object of the process according to the invention, when dumping solid or pumpable waste materials to solidify the liquid phase in the form of aqueous rock salt solution present in or introduced into the salt cavern as a means of retarding and halting the convergence of the salt formation. It is still another object of the subject according to the invention to prevent or decisively reduce the output of contaminated rock salt solution from the salt enclosed cavities.

The above objects are attained by a process in which the rock salt solution contained in the salt cavern is pumped out to the greatest possible extent, after which the particulate solid waste materials are treated before or during trickle-type introduction, at least in adequate quantities, with dust suppressant agents to form free-flowing, non-dusting mixtures and that, if necessary, dust suppressant liquids are also introduced at intervals into the salt enclosed cavity or that the salt cavern filled with rock salt solution is filled with a pumpable mixture including the solid particulate waste materials in such a way that the displaced volume of salt solution is pumped out and that, after the cavern has been filled to about two thirds to three quarters, the water of the liquid phase is bound as water of crystallization or as hydroxide or physically by absorption through the addition of hydrophilic compounds or substances, which causes it to solidify, and that the cavern is then sealed.

DETAILED DESCRIPTION

Figure 2:
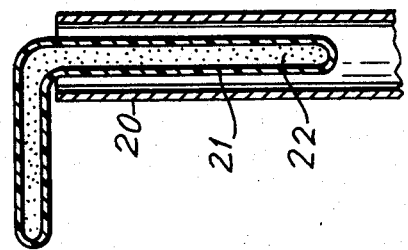
FIG. 2 is a cross-sectional view of a thin-walled sheath enclosing particulate material and being introduced into a pipeline.

Salt caverns are known to be created by solution mining. For this purpose, a bore is sunk through the geological strata overlying the salt dome and is equipped with a pipeline system which consists of pipes for introduction of the solvent such as water or aqueous salt solutions and for drawing off the brine. After the salt cavern has reached the desired size, solution mining is discontinued in such a way that the volume of the salt cavern remains filled with rock salt solution for partial compensation of the convergence pressure.

In order to deposit waste materials, this rock salt solution must be pumped out of the salt cavern. Removal of this solution without harmful consequences is only possible if this rock salt solution is not contaminated with environmentally damaging materials which may, for example, have entered the supernatant liquid phase of the cavern contents from particulate waste materials which have already been introduced.

For these reasons, according to the invention the rock salt solution originally contained in the salt cavern is pumped out to the greatest possible extent before the pumpable waste materials are introduced into the salt cavern. To pump out the rock salt solution and for the subsequent introduction of the pumpable waste materials, the pipelines can be used which have already been employed for solution mining of the salt cavern and which permit both the withdrawal of liquids from the salt cavern and the introduction of pumpable mixtures.

In the process for dumping particulate solid waste materials in underground, salt enclosed cavities, particularly salt caverns, which are equipped with pipelines for filling and evacuation, by introducing the solid particulate waste materials through the pipeline used for filling, the principal object of the invention is attained by treating the particulate solid waste materials, before or during introduction into the pipeline used to fill the cavity, with dust suppressant agents in quantities which do not appreciably impair the free-flowing characteristics of the mixtures which are formed.

To apply the process according to the invention, solid waste materials can be used which are particulate either naturally or as a result of the manner of their production or which have been converted to particulate form by means of appropriate comminution measures. Waste materials of this kind are for example residues from the combustion of solid fuels or refuse materials, waste materials from flue gas purification or desulfurization, flue dusts and ash, metal dusts and turnings, waste materials and residues from chemical processes and residues from the metal producing and working industry, household and hospital refuse and the like. Adhesive and moist waste materials can also be used according to the invention. These are preferably mixed with the particulate solid waste materials which are dry and non-adhesive and which act as dust suppressant agents in such quantities that a free-flowing mixture is formed from these components which does not generate dust during handling.

Furthermore, aqueous solutions of hygroscopic salts such as magnesium or calcium chloride can also be added to the particulate solid waste materials as dust suppressant agents. The residual solutions from wet processing of crude potash which contain magnesium chloride can also be used to particular advantage for this purpose. The aqueous solutions of hygroscopic salts have been found to have particular efficacy as dust suppressant agents if they contain small amounts of non-ionogenic wetting agents.

Liquid paraffins or liquid silicone oils can also be admixed to the particulate solid waste materials as dust suppressant agents. The paraffins used for this purpose can be naturally liquid at application temperature or can be liquified by heating.

Waste oils and aqueous emulsions of such oils, such as drilling muds, can also be admixed to the particulate solid waste materials as dust suppressant agents.

For successful application of the process according to the invention, it is essential that a free-flowing mixture which generates no dust during handling be formed as a result of admixture of the dust suppressant agent to the particulate solid waste materials. Mixing of the particulate solid waste material with the dust suppressant agent can be performed in all devices suitable for mixing of solids with small amounts of liquid.

Particularly successful results have been obtained by spraying the liquid dust suppressant agents onto the particulate solid waste materials, for example, while the materials are passed in the form of a thin-layer bed on a conveyor belt below the spraying device.

For this treatment it may be expedient to fluidize the bed of the particulate solid waste materials and to use for this purpose a gas permeable conveyor device through which air can be blown from below into the bed of particulate solid materials. The particulate solid waste materials can also be sprayed through nozzles with the dust suppressant agents in a fluidized bed chamber. Spraying and mixing of the particulate solid waste materials with the dust suppressant agents can also be performed in a fluidized bed chamber. Spraying and mixing of the particulate solid waste materials with the dust suppressant agents can also be performed in a rotary drum. With this method, when using superfine particulate solid waste materials such as flue ash, it can be advantageous to proportion the quantity of dust suppressant agent to be added in such a way that a fine particulate granular material, preferably with a grain size up to 1 mm, is formed.

Figure 1:
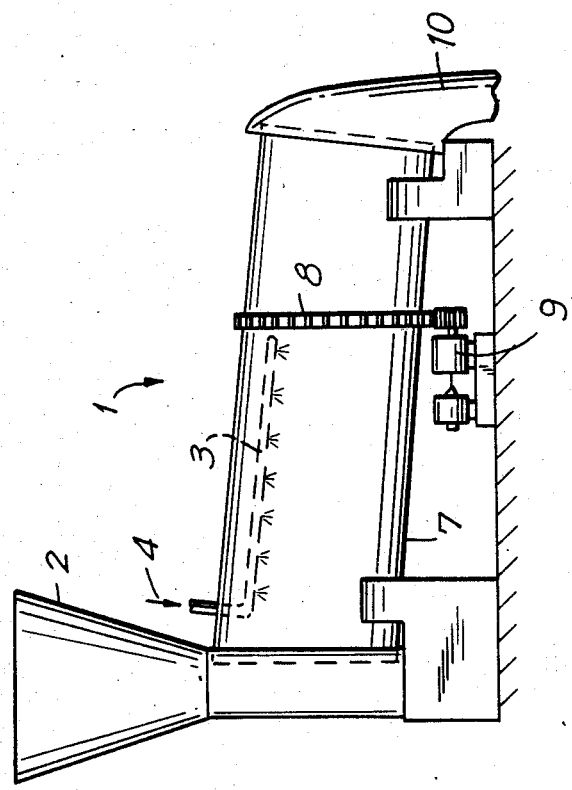
FIG. 1 is a diagrammatic view of a rotary drum containing spray means for supplying a dust suppressant.

FIG. 1 illustrates a rotary drum 1 in which the particulate solids may be introduced via hopper 2 into a rotating pipe 7 which is provided with spray means 3 supplied with a dust suppressant at inlet 4. The pipe 7 is rotated by means of gear 8 and motor 9. The treated material exits by chute 10.

In all cases, the quantity of dust suppressant agent to be added should be such that a non dust-generating mixture is formed with the particulate solid waste materials which is free-flowing and does not cake during storage.

To prevent the walls of the salt cavern, which consists mainly of rock salt, from reacting with acidic components of the particulate solid waste materials, the particulate solid waste materials giving an acidic reaction are preferably at least neutralized or alkalized before mixing with the dust suppressant agents by adding alkaline substances. Waste materials giving an alkaline reaction are preferably used for this purpose. Materials which have dust suppressant properties and which at the same time neutralize the particulate solid waste materials can also be used for this purpose. Thus for example aqueous solutions or suspensions of alkali or alkaline earth hydroxides and carbonates can also be used as alkaline reacting agents for this purpose.

A further alternative of the process according to the invention is illustrated in FIG. 2 and also offers the possibility of enclosing the mixtures 22 of particulate solid waste materials and the dust suppressant agents in hose-shaped, thin-walled sheaths 21 whose diameter is smaller than the internal diameter of the vertical pipeline 20 and to introduce them in this form into the salt enclosed cavity of the salt cavern. Sheaths of plastic impregnated paper or other readily tearing casing material have proved particularly successful for this purpose. The mixture of particulate solid waste materials and dust suppressant agents enclosed in these casing materials are introduced into the vertical pipeline leading to the salt cavern.

Due to the fact that the mixture of particulate solid waste materials and dust suppressant agents, if necessary after they have previously been enclosed in readily tearing casing material, fall a long distance in the vertical pipeline leading to the salt cavern, the waste materials drop with high impact onto the waste materials already stored in the salt cavern. This results in compression of the layer of particulate solid waste materials which is being built up in the salt cavern without any dust thereby being raised which would charge the air displaced from the salt cavern and which would then have to be removed from this air above ground by means of elaborate technical processes.

Encapsulation of the mixture of particulate solid waste materials and the dust suppressant agents in readily tearing casing materials also offers the advantage that caking is avoided in the vertical pipeline. The casing materials used for this purpose should be such that they burst open and release their contents on hitting the waste materials already deposited in the salt cavern.

Should dust nevertheless be detected in the air issuing from the salt cavern when implementing the process according to the invention, it may be advantageous to introduce additionally and at intervals dust suppressant liquids into the salt enclosed cavity of the salt cavern in order also to prevent this dust being generated.

The compression of the waste materials already deposited caused by the force of impact of the mixtures of particulate solid waste materials and dust suppressant agents introduced into the salt cavern in a free-fall manner contributes to a considerable extent to compensating the convergence pressure which is exerted on the walls of the salt caverns by the geological formations surrounding the rock salt cavern. This effect is particularly desirable when the salt cavern is sealed, after two thirds to three quarters of its volume has been filled with the mixtures of particulate solid waste materials and dust suppressant agents. Due to the partial compensation of the convergence pressure, the pressure acting on the roof of the salt cavern and thus on the permanent seal is greatly reduced.

The salt cavern is sealed with the aid of known methods using known means which guarantees that the particulate solid waste materials deposited according to the invention are permanently and securely dumped and represent no hazard to the environment.

With the aid of the process according to the invention, solid waste materials which are originally particulate in form or which have been converted to particulate form by comminution are stored in salt caverns. Waste materials of this kind are for example residues from the combustion of fossil fuels or refuse, waste materials from flue gas purification and desulfurization, flue dusts and ash, metal dusts and turnings, waste products and residues from chemical processes and from metal producing and working processes, domestic and hospital refuse and the like. Adhesive and resinified waste products from the production of organic substances, which may also contain halogens, can also be used as solid waste materials for the process according to the invention. The greatly varying compositions of such waste materials are known from the state of the art.

According to the invention, a rock salt solution is used as conveying medium for these waste materials, which is withdrawn from the salt cavern to be filled. After solution mining of a salt cavern, the cavern is usually still filled with saturated rock salt solution as a means of compensating for the convergence pressure of the geological formations surrounding the salt cavern. When introduction of the waste materials is commenced, a corresponding volume of this saturated rock salt solution is withdrawn from the salt cavern and is mixed with the waste materials to be introduced to form a pumpable mixture.

For this purpose the salt cavern must be equipped with pipelines, incorporating suitable pumping devices for filling and evacuation, such as are known from solution mixing and petroleum engineering. The pipeline for filling the salt cavern should preferably terminate in the lower part of the salt cavern, as close as possible to the cavern floor, and must be displaceable along its longitudinal axis. This affords the possibility of relocating the lower end of this filling line upwards in the cavern space if sediment already deposited in the cavern space is to be prevented from being agitated by the filling flow during the filling process. In other cases it can be desirable to achieve this very effect, for which purpose it is advantageous to lower the end of the filling line to a point immediately above the cavern floor.

According to the invention, the particulate solid waste materials are mixed with rock salt solution which has been withdrawn from the salt cavern into which the materials are to be deposited. The relative quantities of particulate solid waste materials and rock salt solution should be such that the mixture of these two components is pumpable.

While removing a volume of rock salt solution from the salt cavern corresponding to the volume of particulate solid waste materials, the pumpable mixture of particulate solid waste materials and rock salt solution is introduced into the salt caverns. This volume of rock salt solution must be disposed of in a non-harmful manner. If this rock salt solution is not contaminated with harmful materials, it can be dumped at sea.

This procedure can be repeated until the salt cavern is virtually filled with particulate solid waste materials. After the first filling of particulate solid waste materials in the salt cavern as described above has been concluded, the contents of the salt cavern are allowed a resting period to allow the particulate solid waste materials to settle on the floor of the salt cavern. After this, the quantity of rock salt solution needed for putting further amounts of particulate solid waste materials into suspension is drawn off from the liquid phase which has separated out over the sediment deposited in the salt cavern. If solids are still entrained by this saturated rock salt solution when it is withdrawn, it may be advantageous to separate these solids from the saturated rock salt solution before it is mixed with the particulate solid waste materials. The possibility, which is advantageous in other cases, also exists of mixing the rock salt solution together with the entrained solids withdrawn from the cavern with the particulate solid waste materials.

If the volume of the rock salt cavern is to be further enlarged during the introduction of the particulate solid waste materials, fresh water or an unsaturated aqueous solution with sodium chloride can be added to the mixture of these waste materials and the rock salt solution withdrawn from the cavern, so that finally at least a pumpable mixture is formed. When filling such a mixture into the salt cavern, a volume of saturated rock salt solution must be withdrawn from the cavern which corresponds to the sum of the volumes of particulate solid waste materials and the fresh water or the unsaturated aqueous solution with sodium chloride which has been added.

To promote the sedimentation of the particulate solid waste materials from the mixture with rock salt solution, it is advantageous to introduce this mixture close to the floor of the salt cavern and to withdraw the rock salt solution to be removed from above the sediment-/liquid interface.

If the particulate solid waste materials contain components which are soluble in rock salt solution and whose pH value is subject to change, it is advantageous to neutralize the mixture of these solid waste materials and the rock salt solution before or during introduction into the salt cavern. In this way undesired chemical reactions which may occur with the waste materials deposited in the salt cavern with formation of gaseous reaction products are prevented.

Should the particulate solid waste material to be deposited contain heavy metal compounds which are soluble in rock salt solution, it is favorable to add precipitation agents which form insoluble or sparingly soluble compounds with heavy metals to the mixture of particulate solid waste materials and rock salt solution before it is introduced into the salt cavern. By this means, other possible chemical reactions in the dumped material are also prevented and the heavy metals are also introduced into the salt cavern as precipitable solids. Alkali hydroxides and/or oxides and/or carbonates have proved successful as precipitation agents.

If appreciable quantities of water or other liquids are introduced with particulate solid waste materials in their mixture with the rock salt solution, a corresponding amount of the rock salt solution withdrawn from the salt cavern must be separated from the process and disposed of in a non-harmful manner. This can be brought about by dumping this rock salt solution at sea or in lower-lying geological formations such as dolomitic slabs which can absorb liquids.

In cases where liquids not miscible with and having a lower specific gravity than the rock salt solution introduced into the salt cavern with the particulate solid waste materials according to the invention are introduced into the salt cavern, it is advantageous to leave the cavern contents at rest for a certain period until these liquids of lower specific gravity have collected as a layer at the surface of the liquid phase of the cavern contents, which are then drawn off separately from the remaining liquid phase. These liquids of lower specific gravity are usually organic in nature and, depending on their composition, can be processed into valuable products. This variant of the process according to the invention can however only be applied in those cases in which considerable quantities of such organic liquids have already been introduced into the salt cavern.

If the preferably organic liquids not miscible with the rock salt solution are present in the contents of the salt caverns only in small amounts, it can be advantageous to draw these off from the salt cavern after sedimentation of the particulate solid waste materials in the mixture with rock salt solution and to wait for phase separation of this mixture to occur above ground and then to separate from it the liquids not miscible with the rock salt solution.

Dumping of the particulate solid waste materials can also be performed in combination in several salt caverns, whereby the rock salt solution is pumped out of a first salt cavern and mixed with the particulate solid waste materials to form a pumpable mixture which is continuously introduced into the second salt cavern up to a given filling level, preferably between $\frac{1}{2}$ to $\frac{2}{3}$ of its storage space. After this, dumping in this salt cavern is stopped and a resting period is observed until the solids have sedimented up to the sedimentation volume. Following this, the supernatant rock salt solution is drawn off from this second salt cavern and introduced into the first salt cavern for storage. During the resting period for the second salt cavern, introduction of the pumpable mixture is changed over to a third salt cavern which is filled in the same manner, the resting period up to sedimentation of the solids observed and subsequently and in the same manner the supernatant rock salt solution is pumped off and the process is switched back to the second salt cavern for continuous introduction of the pumpable mixture. In this way, continuous dumping of the particulate solids can be carried out with these three salt caverns in combination by means of the process according to the invention.

It can also be advantageous for dumping of the solid materials according to the process of the invention to be performed in several salt caverns, with a waste material of identical type and composition being deposited in each salt cavern and, if suitable, a mixed product consisting of different waste materials or different waste materials in succession being introduced into another salt cavern. This method of dumping the particulate solid waste materials can be highly advantageous with a view to possible reutilization of these waste materials in the future, when industrial research has developed the necessary processes.

To prepare the pumpable mixture from the particulate solid waste materials and the rock salt solution it can be advantageous to force the latter under pressure into the container filled with the particulate solid waste materials and to draw off the pumpable mixture from the lower end of this container so that it can be filled directly into the salt cavern. This method permits particularly favorable emptying of the transport container in which the particulate solid waste materials are conveyed to the overground plant of the rock salt cavern. This method saves storage space for intermediate storage of these particulate solid materials.

For the process according to the invention, the rock salt solution withdrawn from the salt cavern is used practically as a conveying solution for the particulate solid waste materials, by means of which these materials can readily be filled into the salt cavern in the form of a pumpable mixture. This method eliminates the need to dry the particulate dry solid waste materials beforehand and it is also possible to process adhesive waste materials according to the invention which would inevitably choke the filling line when being trickled into the cavern.

The possibilities known from the processing of raw potash of forcing the salt solutions generated as waste products into subterranean strata which, such as dolomitic slab, have the capacity to absorb liquids, are too elaborate in their application for the task to be solved here and furthermore do not guarantee that the harmful materials from the contaminated rock salt solutions introduced into these strata will not ultimately pollute water taken for drinking purposes. Finally this method of removing contaminated rock salt solutions is precluded by the limited capacity for and rate of uptake of such strata having the capacity to absorb liquids, which are limited by the pore and capillary volume of such strata.

The generally known possibilities of purifying industrial waste waters, as described for example by Meinck et al in the book "Industrieabwässer" (1968), Publ. Gustav Fischer, are highly demanding in terms of technical equipment, energy and chemicals. With these methods, moreoever, the purified water which is discharged into receiving water is accompanied by considerable amounts of precipitation products and sewage sludge which are contaminated with the harmful substances contained in the waste waters and must themselves also be dumped.

After the pumpable waste materials have been introduced into the salt cavern, the solid components of these waste materials sink to the floor of the cavern and remain there in the form of sediment, above which the liquid components of these pumpable waste materials collect as a closed layer. This liquid layer, depending on the nature and composition of the introduced pumpable waste materials, can consist of water which becomes a virtually saturated rock salt solution due to dissolution of rock salt from the walls of the salt cavern. Above this aqueous layer, the organic liquids of lower specific gravity collect in the form of a separate layer which can be contained in the pumpable waste materials and which are not miscible with a saturated rock salt solution. This layer of organic liquids can be drawn off from the salt cavern separately and conducted to a processing system.

Parts of the aqueous layer, even if they are contaminated with harmful substances, can also be withdrawn again from the salt cavern and mixed with non-pumpable waste materials to form a pumpable mixture which is introduced into the salt cavern.

Seepage waters containing inorganic and organic materials or harmful substances such as originate from overground dumps, stockpiles or from sewage treatment works, can also be mixed with non-pumpable waste materials or sludges to improve the pumpability of these non-pumpable waste materials. In this way, the technically demanding elimination of harmful substances from these seepage waters which would otherwise be necessary is dispensed with.

According to the process of the invention, not only pumpable waste materials such as liquid residues from chemical and other industrial processes, but also non-pumpable wastes such as ash, flue dusts, residues from incinerator plants, sewage sludge and the like can be processed if they can be converted to a pumpable state by admixture of liquid waste materials, seepage waters and/or liquids withdrawn from the salt cavern.

When the salt cavern has been filled in this way with the waste materials to about two thirds to three quarters of its volume, according to the invention the water contained in the supernatant liquid phase of the contents of the salt cavern is bound chemically in the form of water of crystallization or in the form of hydroxides or physically by means of absorption through the addition of suitable compounds or substances.

It has proved useful for this purpose to introduce salts containing magnesium chloride and/or magnesium sulfate, such as are obtained in the processing of raw potash, into the supernatant liquid phase of the contents of the salt cavern. The system $NaCl-MgCl_2-H_2O$ then forms in the liquid phase of the contents of the salt cavern, from which at the temperature of the deposit the solid salt 1880 g $MgCl_2$ + 1000 g $H_2O$, or the system $NaCl-MgSO_4-H_2O$, crystallizes out, from which the salts 3156 g $Na_2SO_4$ + 3124 g $MgSO_4$ + 1000 g $H_2O$ or 1972 g $Na_2SO_4$ + 1673 g $MgSO_4$ + 1000 g $H_2O$ crystallize. Because of the binding of the water of crystallization, these crystallization processes increase not only the solids content of the contents of the salt cavern, but also the concentration of the sodium chloride in the liquid phase to above the saturation concentration so that sodium chloride additionally crystallizes which in turn also increases the solids content of the contents of the salt caverns.

Instead of the salts containing magnesium chloride and/or magnesium sulfate or in addition to these, layer lattice minerals can be introduced into the supernatant liquid phase of the contents of the salt cavern after they have been chemically or thermally expanded. Expanded layer lattice minerals of this kind are, for example, expanded vermiculites and/or perlites and/or light expanded clay aggregates which are distinguished by their high absorptive capacity for liquids. In this way the supernatant liquid phase of the contents of the salt cavern is solidified at least to a major extent.

According to the invention, the possibility also exists, particularly with periodic introduction of the pumpable waste materials into the salt cavern, of waiting for sedimentation of the solids contained in the contents of the salt cavern to occur after the introduction and then to draw off the supernatant liquid phase from this salt cavern and to convey it to another salt cavern and only there to bind the water contained in this liquid phase chemically in the form of water of crystallization or as hydroxide or physically to inert absorbents by addition of suitable compounds or substances.

The solid components of the waste materials originally contained in the salt cavern and still permeated with liquid can additionally be solidified by introducing inorganic binders such as Portland cement or oxychloride cement or by adding magnesium chloride solution containing magnesia.

To further increase the solids content of the cavern contents and also to allow solid waste materials or waste materials with low abrasion resistance or waste materials in the form of dust to be stored in salt caverns in a non-harmful manner, it can be advantageous to enclose these waste materials in sections of plastic sheathing whose diameter is smaller than the internal diameter of the filling pipe of the salt cavern. In this form, these waste materials can be introduced without difficulty into the salt cavern by free fall through the filling pipe.

The invention offers the possibility of storing in salt caverns, filled with virtually saturated rock salt solution, waste materials with constituents which contaminate saturated rock salt solutions with harmful substances, for which purpose these waste materials must be naturally pumpable or must be capable of being made pumpable through admixture of liquids which are drawn off from the liquid phase of the contents of the salt cavern. In this process according to the invention, the production of rock salt solution contaminated with harmful materials is completely avoided.

The invention prevents contamination of the rock salt solution present in the salt cavern in a very simple manner in that this rock salt solution is first pumped out to the greatest possible extent before the waste materials which could cause contamination of this rock salt solution are introduced into the salt cavern. This non-contaminated rock salt solution can be dumped harmlessly at sea or can be buried in suitable layers of the subsoil.

According to the invention, the liquids introduced with the waste materials into the salt cavern are bound chemically or absorptively and remain in this form in the rock salt cavern which is finally sealed.

The process according to the invention also dispenses with prior processing above ground of the waste materials to be dumped as a means of eliminating the harmful materials from them which, while involving technically demanding operations, ultimately yields a concentrate of harmful materials which must in turn be disposed of in a manner non-harmful to the environment.

The invention offers a technically simple method of dumping safely, and thereby eliminating, waste materials containing harmful contaminant substances without presenting any hazard to the environment.

We claim:

1. A process for dumping of particulate solid waste materials in an underground salt enclosed cavity containing rock salt solution and equipped with pipelines for filling and evacuation, comprising the steps of pumping out as much rock salt solution as possible from the cavity, rendering the particulate solids dust-free by treatment with a dust suppressant in an amount which does not appreciably impair free-flowing characteristics of the particulate solid waste materials, introducing the dust-free particulate solids into the pipelines used to fill the cavity until about two thirds to three quarters of the cavity is filled without dust generation, solidifying any water present in the dust suppressant together with any rock salt solution remaining in the cavity and sealing the cavity.

2. The process according to claim 1, wherein the particulate solid waste material has an acidic reaction and further comprising the step of adding an alkaline substance in an amount sufficient to at least neutralize the acidic material.

3. The process according to claim 2, wherein the alkaline substance is selected from the group consisting of alkaline waste material, and solutions of alkali and alkaline earth metal hydroxides and carbonates.

4. The process according to claim 1, further comprising the step of adding a salt selected from the group consisting of magnesium chloride and magnesium sulfate and mixtures thereof to any rock salt solution in the cavity in order to solidify the rock salt solution by forming a salt containing water of crystallization.

5. The process according to claim 1, further comprising the step of adding a water-binding material selected from the group consisting of expanded lattice layer mineral, hydraulic cement and oxychloride cement in order to solidify the rock salt solution.

6. The process according to claim 5, wherein the expanded lattice layer mineral is selected from the group consisting of perlite and vermiculite.

7. The process according to claim 1, wherein said dust suppressant is sprayed upon a bed of particulate solid waste material.

8. The process according to claim 7, wherein said spraying takes place in a rotary drum.

9. The process according to claim 8, wherein the particulate solid materials are granulated in said drum.

10. The process according to claim 1, wherein the dust suppressant is selected from the group consisting of adhesive waste materials, moist waste materials, aqueous solutions of hygroscopic salts, liquid paraffins, silicone oils, waste oils, and aqueous emulsions of waste oils.

11. The process according to claim 10, wherein the dust suppressant is a solution of a hygroscopic salt containing a non-ionogenic wetting agent.

12. The process according to claim 1, wherein the dust-free particulate solid waste materials are encased in hose-shaped, thin-walled sheaths having a diameter smaller than the internal diameter of the filling pipeline.

13. The process according to claim 12, further comprising the step of filling the sheaths with additional adhesive waste materials.

* * * * *